(12) United States Patent
Nomura et al.

(10) Patent No.: US 9,929,557 B2
(45) Date of Patent: Mar. 27, 2018

(54) PROTECTION ELEMENT

(71) Applicant: LITTELFUSE JAPAN G.K., Kawasaki (JP)

(72) Inventors: Keiichiro Nomura, Chiba (JP); Nobuyuki Shibahara, Narita (JP); Takayuki Yokota, Narita (JP)

(73) Assignee: LITTELFUSE JAPAN G.K., Tokyo (JP)

( * ) Notice: Subject to any disclaimer, the term of this patent is extended or adjusted under 35 U.S.C. 154(b) by 435 days.

(21) Appl. No.: 14/424,403

(22) PCT Filed: Aug. 30, 2013

(86) PCT No.: PCT/JP2013/073264
§ 371 (c)(1),
(2) Date: Aug. 3, 2015

(87) PCT Pub. No.: WO2014/034833
PCT Pub. Date: Mar. 6, 2014

(65) Prior Publication Data
US 2015/0333497 A1   Nov. 19, 2015

(30) Foreign Application Priority Data
Aug. 31, 2012   (JP) .................................. 2012-192157

(51) Int. Cl.
*H02H 5/04* (2006.01)
*H02H 3/08* (2006.01)
(Continued)

(52) U.S. Cl.
CPC ............ *H02H 3/085* (2013.01); *H01H 85/11* (2013.01); *H01M 2/34* (2013.01); *H02J 7/0029* (2013.01)

(58) Field of Classification Search
CPC ........ H01H 85/08; H01H 85/11; H02H 3/085; H02H 5/04; H02H 5/047; H01M 10/0525; H02J 7/0029; H01L 2924/00
(Continued)

(56) References Cited

U.S. PATENT DOCUMENTS

| 4,320,374 A | * | 3/1982 | Narancic | .............. | H01H 85/055 |
|---|---|---|---|---|---|
| | | | | | 337/162 |
| 2003/0169143 A1 | * | 9/2003 | Tanaka | ................ | H01H 37/761 |
| | | | | | 337/159 |
| 2009/0027821 A1 | | 1/2009 | Colby et al. | | |

FOREIGN PATENT DOCUMENTS

| CN | 102089834 | 6/2011 |
|---|---|---|
| JP | 10-275546 A | 10/1998 |

(Continued)

OTHER PUBLICATIONS

International Search Report for International Application No. PCT/JP2013/073264, dated Dec. 3, 2013.
(Continued)

*Primary Examiner* — Dharti Patel

(57) ABSTRACT

The present invention provides a protection device which includes a laminar element 16 which is formed of an insulation resin and has at least one throughhole; electrically conductive metal thin layers 22 and 28 which are positioned on each of main surfaces of the laminar element, and a fuse layer 40 which is positioned on a side surface defining said at least one throughhole and electrically connects the electrically conductive metal thin layers. The fuse layer includes a first metal layer 41 consisting of a metal having a higher melting point and a second metal layer 42 consisting of a metal having a lower melting point. The protection device of the present invention allows a larger amount of a current to flow therethrough and can provide a protection from an excessive current.

13 Claims, 3 Drawing Sheets

(51) Int. Cl.
  *H02J 7/00* (2006.01)
  *H01H 85/11* (2006.01)
  *H01M 2/34* (2006.01)
(58) Field of Classification Search
  USPC .......................................................... 361/103
  See application file for complete search history.

(56) References Cited

FOREIGN PATENT DOCUMENTS

| | | | |
|---|---|---|---|
| JP | 2002-42632 A | | 2/2002 |
| JP | 2002042632 | * | 2/2002 |
| JP | 2007-280807 A | | 10/2007 |
| JP | 2009-32696 A | | 2/2009 |
| TW | 201241858 A | | 10/2012 |
| TW | 201423816 A | | 6/2014 |

OTHER PUBLICATIONS

International Search Report for International Application No. PCT/JP2013/073268, dated Nov. 26, 2013.
Kazuo Ohmine et al., "Cylindrical Lithium Ion Battery "CGR26650" for Power Tools", *Matsushita Technical Journal*, vol. 52, No. 4, Aug. 2006, pp. 31-35.

* cited by examiner

PROTECTION ELEMENT

FIELD OF THE INVENTION

The present invention relates to a protection device which protects an electrical apparatus, in particular to a protection device which protects an electrical element or a circuit which is included in an electrical apparatus. For example, the present invention relates to a protection device which interrupts an excessive current when the excessive current flows through an electrical apparatus such as a secondary battery, that is, the present invention relates to an excessive current protection device.

BACKGROUND OF THE INVENTION

A thermal fuse device, a current fuse device, a polymer PTC device, or the like is used as a protection device which interrupts an excessive current when the excessive current flows during charging or discharging of a cylindrical lithium-ion secondary battery. In particular, the polymer PTC device is useful in that since it can be positioned by incorporating into a sealing plate of the secondary battery, a battery pack which is particularly composed of many of the secondary batteries becomes to be compact.

However, a large amount of current (for example, a current of 10 A) cannot be continuously flowed through for example a commercially available annular PTC device. Furthermore, the PTC device has a resettability to be in a low resistance state when an abnormality is removed and its temperature is decreased, but may cause a problem depending on its application. For example, in case wherein the PTC devices are used in a cylindrical lithium-ion secondary battery cell which is used in multi-parallel, a shorting cell in which the PTC device continues to produce heat and there is a possibility that the cell bursts as long as such cell is not removed.

In view of the above described problem, it was proposed, for example, that a spacer is used in place of the PTC device inside the sealing plate in the cylindrical lithium-ion secondary battery cell (see Non-Patent Reference 1 below). However, when the spacer is used, there is a problem that a protection from the excessive current cannot be ensured.

Matsushita Technical Journal, Vol. 52, No. 4, August 2006, pp. 31-35, is a prior reference.

SUMMARY OF THE INVENTION

Furthermore, with an excessive current protection device, even when an excessive current does not greatly exceed a rated capacity, for example, the excessive current is about two times a rated capacity, it is preferable to rapidly and surely interrupt the excessive current. The problem to be solved by the invention is to provide a protection device which allows a larger amount of current to flow while providing a protection from an excessive current which does not greatly exceed a rated capacity, for example the excessive current about two times a rated capacity.

In the first aspect, the present invention provides a protection device which comprises a laminar element which is formed of an insulation resin and has at least one throughhole, an electrically conductive metal thin layer which is positioned on each of main surfaces of the laminar element, and a fuse layer which is positioned on a side surface defining at least one of said at least one throughhole and electrically connects the electrically conductive metal thin layers wherein the fuse layer comprises at least a first metal layer consisting of a metal having a higher melting point and a second metal layer consisting of a metal having a lower melting point.

In the second aspect, the present invention provides an electrical apparatus such as a secondary battery which comprises the protection device of the present invention as described above and below.

The protection device of the present invention comprises the laminar element which is formed of an insulation resin, and the laminar element has at least one throughhole. This throughhole extends along the thickness direction of the laminar element and passes through the laminar element. Its cross-section shape in the direction perpendicular to the thickness direction is not particularly limited, and for example, it is preferably a circular shape. However, the cross-section shape may be other shape, for example, a square shape, a rhombus shape, a rectangle shape or an ellipse shape. The number of the throughholes is at least one. In other words, the number may be one or not less than two, for example, two, three, four, five, eight or nine, and may be appropriately selected depending on a degree of the protection which is required for the protection device. When the laminar element has one throughhole, the throughhole is positioned at the center of the laminar element, that is, at the center of the cross-section in the direction perpendicular to the thickness direction.

The insulation resin which constitutes the laminar element is not particularly limited as long as having an electrically insulating property. For example, a resin such as polyethylene, polypropylene, polycarbonate, a fluorine resin, an ABS resin, a polycarbonate-ABS alloy resin, a PBT resin, elastomer and the like can be exemplified. In particular, it is preferable to use a resin such as polyethylene or polyvinylidene fluoride. Such resin has an advantage in that it has flexibility comparable with a polymer which is used for the polymer PTC component, so that the protection device of the present invention can be incorporated into a sealing plate of a secondary battery cell in place of the polymer PTC component, and it can generally be used in the electrical apparatus reliably. In other embodiment, the protection device of the present invention may be used in place of the above described spacer which is used in the inside of the sealing plate of the secondary battery cell. In this case, the protection device can be used as a washer.

This laminar element comprises the electrically conductive metal thin layers which are disposed on the main surfaces of its both sides. Such electrically conductive metal thin layer is not particular limited as long as being a thin layer (for example, a layer having about 0.1 μm-100 μm of thickness) of a metal having an electrically conductive property. For example, the metal thin layer can be made of a metal such as copper, nickel, aluminum, gold or the like and may be formed from multiple metal layers.

The laminar element on each main surface of which the electrically conductive metal thin layer is positioned can be produced by simultaneously extruding the insulation resin which constitutes the laminar element together with metal sheets (or metal foils) which constitute the metal thin layers to obtain an extruded product in which the insulation resin is sandwiched between the metal sheets (or the metal foils). In other embodiment, the laminar element can be produced by obtaining a laminar product of the insulation resin, for example by extruding, sandwiching the laminar product between the metal sheets (or the metal foils), and thermally-compressing them together such that they become integral to obtain a pressure-bonded product. Such extruded product (or such pressure-bonded product) is in the state where a plurality of the laminar elements of the insulation resin which has the electrically conductive metal thin layer on its both main surfaces are aggregated adjacently to each other. The extruded product (or the pressure-bonded product) is cut into a prescribed shape having a prescribed size to obtain a single laminar element having the electrically conductive thin layers.

Furthermore, in other embodiment, the electrically conductive metal thin layer may be formed on each of the main surfaces of the laminar element of the insulation resin by plating the laminar element with an electrically conductive metal. Also in this case, it is preferable to obtain an aggregate product as described above, and then, divide it into individual laminar elements.

When the plating is conducted as described above, it is preferable to make a separate metal layer, particularly preferably a metal foil, adhere tightly to each of the main surfaces of the laminar element beforehand, for example, by extruding or thermally-compressing similarly as described above. In this case, it is preferable to form the electrically conductive metal thin layer on the separate metal layer by plating. When the electrically conductive metal thin layer is formed by plating, this has an advantage in that the plated layer as the electrically conductive metal thin layer adheres tightly to the separate metal layer which already adheres tightly to the laminar element. For example, the protection device of the present invention has nickel foils or nickel plated copper foils as the separate metal layers on the both main surfaces of the laminar element, and has a metal layer which forms the electrically conductive metal thin layer and the fuse layer which are formed by nickel-plating and tin-plating.

The shape of the laminar element is not particularly limited as long as its dimension along the thickness direction is smaller, preferably considerably smaller than the other dimensions (for example, a sheet-shape). The planar shape of the laminar element (a figure seeing the laminar element from just above, and for example, a profile of the protection device as shown in FIG. 2) or the cross-section shape of the laminar element in a direction perpendicular to the thickness direction of the laminar element is preferably an axisymmetric and/or point-symmetric shape, and for example, a circular shape, a square shape, a rhombus shape, a rectangle shape or an annular shape (in particular, a circular ring shape, a so-called doughnut shape).

In particular, it is preferable that the laminar element is preferably in an annular shape, particularly a circular ring shape. When it is in the annular shape, a central opening, for example a central circular opening in the case of the circular ring shape, may be the throughhole of the present invention. Furthermore, the laminar element may have one or more additional throughholes, for example a throughhole whose cross-section is in a circular shape in a portion between an inner periphery and an outer periphery which define the annular shape.

The protection device of the present invention has the fuse layer which is positioned on the side surface which defines at least one such throughhole and electrically connects the electrically conductive metal thin layers which are positioned on the both main surfaces of the laminar element. The fuse layer comprises at least two metal layers having different melting points from each other (hereinafter, among two metal layers, a layer consisting the metal having a higher melting point is referred to as a "first metal layer" and a layer consisting the metal having a lower melting point is referred to as a "second metal layer"). The fuse layer may comprise three or more metal layers. When the fuse layer comprises three or more metal layers, all metals forming these layers are not needed to be different from each other, and at least two may be different. Preferably, a melting point of the metal layer other than the first metal layer and the second metal layer is the same as or higher than a melting point of the second metal layer, and more preferably, the same as or lower than a melting point of the first metal layer and the same as or higher than a melting point of the second metal layer. When the above described metal layers are laminated, an order of laminating them is not limited and can be appropriately selected depending on product requirements. For example, when a corrosion resistance property is required, a metal forming an outermost layer can be Ni or the like. It is preferable that the metal layers are laminated, although the present invention is not limited thereto, for example, one metal layer may be formed on a half of a peripheral surface of the throughhole and the other metal layer may be formed on the other half of the peripheral surface". The protection device of the present invention can rapidly and surely interrupt an excessive current with suppressing an arc-generation even when the excessive current which is 1.2-4 times, preferably 1.5-2.0 times a rated capacity of the protection device is flowed.

Although the present invention is not bound by any theory, it is contemplated that the protection device of the present invention interrupts the excessive current as follows: When an excessive current is just about to flow from one electrically conductive metal thin layer to the other electrically conductive metal thin layer, the excessive current concentrically flows through the fuse layer, so that and the fuse layer generates heat, and as the result, the second metal layer consisting of the metal having the lower melting point is firstly fused. As the result, since a current flowing through the second metal layer flows through the first metal layer, so that an amount of and a current flowing through the first metal layer increases. Therefore, even when an excessive current of which ratio to a rated capacity of the protection device is smaller, for example, an excessive current 1.5-2.0 times the rated current flows, the first metal layer is rapidly fused, and the excessive current is rapidly and surely interrupted. When the fuse layer comprises three or more metal layers, a metal having the lowest melting point is firstly fused, as the result of which the current is diverted into the other metal layers similarly to the above so that the current flowing through these metal layers increases. Such fusing of the metal layer and such diverting of the current are repeated, as the result of which the fuse layer is rapidly fused and the excessive current is rapidly and surely interrupted.

A metal constituting the above described metal layer is not particularly limited as long as it is electronically conductive, for example includes Ni, Cu, Ag, Au, Al, Zn, Rh, Ru, Ir, Pd, Pt, an Ni—P alloy, an Ni—B alloy, Sn, an Sn—Ag alloy, an Sn—Cu alloy, an Sn—Ag—Cu alloy, an Sn—Ag—Cu—Bi alloy, an Sn—Ag—Cu—Bi—In alloy, an Sn—Ag—Bi—In alloy, an Sn—Ag—Cu—Sb alloy, an Sn—Sb alloy, an Sn—Cu—Ni—P—Ge alloy, an Sn—Cu—Ni alloy, an Sn—Ag—Ni—Co alloy, an Sn—Ag—Cu—Co—Ni alloy, an Sn—Bi—Ag alloy, an Sn—Zn alloy, an Sn—In alloy, an Sn—Cu—Sb alloy, an Sn—Fe alloy, a Zn—Ni alloy, a Zn—Fe alloy, a Zn—Co alloy, a Zn—Co—Fe alloy, an Sn—Zn alloy, a Pd—Ni alloy and an Sn—Bi alloy.

Among them, the metal having the higher melting point is not limited but includes, for example, Ni, Cu, Ag, Au, Al, Zn, Sn, Rh, Ru, Ir, Pd, Pt, Sn, an Ni—Au alloy, an Ni—P alloy and an Ni—B alloy. It is preferable that the above described first metal layer is formed by electroless plating with the metal having the higher melting point, although the present invention is not limited thereto.

The metal having the lower melting point is not limited but includes, for example, Sn, an Sn—Ag alloy, an Sn—Cu alloy, an Sn—Ag—Cu alloy, an Sn—Ag—Cu—Bi alloy, an Sn—Ag—Cu—Bi—In alloy, an Sn—Ag—Bi—In alloy, an Sn—Ag—Cu—Sb alloy, an Sn—Sb alloy, an Sn—Cu—Ni—P—Ge alloy, an Sn—Cu—Ni alloy, an Sn—Ag—Ni—Co alloy, an Sn—Ag—Cu—Co—Ni alloy, an Sn—Bi—Ag alloy, an Sn—Zn alloy and an Sn—Bi alloy. It is preferable that the metal having the lower melting point has a melting point lower than a decomposition temperature of the insulation resin constituting the laminar element. By use of the electrically conductive metal having a melting point lower than the decomposition temperature of the insulation resin constituting the laminar element, when an excessive flows, the fuse layer is cut off before its temperature reaches the decomposition temperature of the insulation resin, so that the decomposition of the insulation resin can be prevented. The decomposition temperature of the insulation resin means a temperature at which the insulation resin decomposes, and can be measured, for example, by using a Thermogravimetry/Differential Thermal Analysis (TG-DTA) spectrometer. For example, when the insulation resin is a high density polyethylene, a gradual decrease of weight is observed during 300-550° C. in air, in particular, at a temperature of not less than 400° C. a drastic decrease of weight occurs. That is, the deposition temperature is 400° C. The second metal layer is preferably formed by electrolytic plating with the above described metal having lower melting point on the above described first metal layer, although the present invention is not limited thereto.

A thickness of the fuse layer is not particularly limited, and it is for example, preferably 0.001-0.02 mm, and more preferably 0.002-0.015 mm. When the thickness of the fuse layer is less than 0.001 mm, it is difficult to form a uniform plated layer and a pin hole or the like may be generated. On the other hand, when the thickness of the fuse layer is more than 0.02 mm, a cost and time for plating increase. In this case, it is preferable to adjust characteristics of the protection device by increasing the number of the throughholes or a diameter of the throughholes.

A thickness ratio of the metal layers in the fuse layer is not particularly limited as long as desired characteristics can be obtained. For example, when the fuse layer consists of the first metal layer and the second metal layer, the ratio (thickness ratio) between the first metal layer and the second metal layer is 1:100-5:1, preferably 1:25-3:5, more preferably 1:25-3:10.

When one throughhole which has the fuse layer on its side surface is provided, it is preferable that the laminar element is in an annular shape or other suitable planar shape which originally has no hole, and the throughhole (also referred to as "a central throughhole") is provided at its center (when such center is present, for example as in the case of the laminar element whose planar shape is circular (i.e. a disk shape)). As the result, the laminar element properly has the circular ring shape. The current which flows over the electrically conductive metal thin layer on one main surface of the laminar element having the circular ring shape flows toward one end of the throughhole, and then passes through the fuse layer and flows from the other end of the throughhole and radially over the electrically conductive metal thin layer on the other main surface of the laminar element.

In the embodiment wherein the laminar element is provided with one throughhole as described above, in comparison with an embodiment which is described in detail below wherein a plurality of throughholes are provided, it is preferable to provide a larger throughhole as the central throughhole at the center of the circular element, and the fuse layer is provided on the side surface of such throughhole. Since such protection device allows its resistance to lower, it can be suitably used by selecting a suitable metal material when a large amount of a current (preferably 20 A or more of the current, for example 30-40 A or more of the current, and for example 50 A) flows. Additionally, since only one throughhole is provided, the production of the protection device becomes to be simple.

In a preferable embodiment, the laminar element is in a circular ring shape which is defined by an inner periphery 30 and an outer periphery 34 as shown FIG. 2 or 5 which are described below. Preferably, a diameter of a circle which defines the inner periphery of the laminar element is for example 6-16 mm, and a diameter of a circle which defines the outer periphery is for example 13-24 mm. As the protection device when 20-30 A of the current flows, it is preferable that the diameter of the circle of the inner periphery is for example 6.5 mm, and the thickness of the fuse layer is for example 0.008 mm.

When a plurality of the throughholes are provided, it is preferable to arrange the throughholes such that the current passing through the laminar element flows through the fuse layer on each of the throughholes as evenly as possible. For example, a plurality of the throughholes (also referred to as "surrounding throughholes") each of which has the same cross-sectional shape and same size may be provided through a ring part of the annular laminar element having the central throughhole (i.e. in a main body of the laminar element which is defined by the inner periphery and the outer periphery). In this case, it is preferable to provide the throughholes equiangularly as to the center of the circle of the inner periphery which defines the circular ring shape. For example, the throughholes are provided every 180° to form two throughholes, every 120° to form three throughholes, every 90° to form four throughholes or every 60° to form six throughholes. However, the laminar element may have only one surrounding throughhole depending on a condition of using the protection device. Therefore, the number of surrounding throughhole may be for example 1-6.

When the diameter of the circle of the inner periphery which defines the annular laminar element, i.e. the diameter of a cross-sectional circle of the central throughhole is the same as or smaller than the diameter of other throughholes, i.e. the diameter of the surrounding throughholes, the fuse layer may also be provided on a side surface which defines the central throughhole. Conversely, when the diameter of the cross-section of the central throughhole is larger than the diameter of the surrounding throughhole, it is preferable that the fuse layer is not provided on the side surface which defines the central throughhole.

Whether or not the fuse layer is provided on the central throughhole is determined based on whether or not the current flows substantially evenly through the fuse layer on each of the throughholes of the protection device. Simply, in the case wherein the central throughhole has a larger circular cross-section than that of the surrounding throughhole, the fuse layer on the central throughhole lowers the significance of providing the fuse layer on the other throughholes since substantially most of the current flowing through the protection device likely flows through the fuse layer provided on the central throughhole while it is unlikely to flow through the fuse layers provided on the other throughholes having the smaller circular cross-section.

In one preferable embodiment, the laminar element is an annular element which is defined by an outer periphery and an inner periphery, and a throughhole is defined by the inner periphery, and further, other throughhole(s) may be present while passing through the inside of the laminar element, i.e. between the inner periphery and the outer periphery which define the laminar element (namely, a portion of the insulation resin which defines the laminar element) to exist as the surrounding throughhole. Therefore, in this case, there are, in the laminar element, the central throughhole (one) which is defined by the inner periphery and at least one throughhole (corresponding to the above surrounding throughhole) which passes through the main body of the laminar element.

In this embodiment, the fuse element exists on the side surface (i.e. a wall) which defines the surrounding throughhole. In the case where the diameter of the central throughhole is not so different from the diameter of the surrounding throughhole and the fuse layer is also present on the central throughhole, when it is predicted that a current which is equivalent to that flowing through the fuse layer on the surrounding throughhole(s) would flow through the fuse layer on the central throughhole, the fuse layer may also be provided to the central throughhole. In the case where the diameter of the central throughhole is larger than the diameter of the surrounding throughhole(s) and the fuse layer is present on the central throughhole, when it is predicted that the far larger current than that flowing through the fuse layer on the surrounding throughhole(s) flows through the fuse layer on the central throughhole, the fuse layer is not provided to the central throughhole since there is no significance of providing the fuse layer on the surrounding throughhole.

Therefore, in one embodiment of the protection device which has an annular laminar element, for example a circular-ring shaped element, having a plurality of the throughholes, the central throughhole does not have a fuse layer and a plurality of the surrounding throughholes which are circumferentially positioned around the central throughhole have the fuse layers. The number of the circumference along which the surrounding throughholes are provided is generally preferably single, and in some cases, the number may be plural, for example, double or triple circumferences. In the embodiment wherein the fuse layer is provided only on the surrounding throughhole, a resistance of the protection device can be controlled with the number of the provided surrounding throughholes. Therefore, compared to the above described embodiment wherein the fuse layer is provided only to the central throughhole, there is an advantage in that the resistance of the protection device can be easily and precisely varied by simply changing the number of the provided throughholes.

When the laminar element is in an annular shape, for example a circular ring shape, it is preferable that the surrounding throughholes are positioned symmetrically to the center of the laminar element. When there is a plurality of the surrounding throughholes, it may be constituted such that they exist at an equal angle interval around for example the center of for example the annular element, i.e. around the center of a graphic which defines the inner periphery, for example around the center of a circle. For example, two throughholes may be located at every 180°, three throughholes may be located at every 120°, or four throughholes may be located at every 90°.

In a specific embodiment, the diameter of the central throughhole (where the fuse layer is not provided) is 6-16 mm, and the diameter of the cross-section circle of the surrounding throughhole (where the fuse layer is provided) around the central throughhole is 0.2-1 mm. In this embodiment, it is preferable that an outside diameter of the laminar element is for example 13-24 mm. In the protection device when 20-30 A of current flows, it is preferable to provide, for example eight surrounding throughholes of which diameter is 0.6 mm, and the thickness of the fuse layer is, for example 0.008 mm.

It is noted that in any embodiment, the cross-sectional shape of the throughhole may be other suitable are section shape, and preferably an annular shape. In other embodiment, it may be a square shape, a rectangle shape, a rhombus shape, a triangle shape, or the like. In this case, the above diameter corresponds to an equivalent diameter of the other cross-sectional shape.

Therefore, in order that the fuse layer melts with a predicted amount of the excessive current, various factors such as a cross-sectional shape of the throughhole, a size (usually, a diameter) and a length along the thickness direction of the throughhole, a thickness of the fuse layer, a material of each metal layer and a ratio of the metal layers in the fuse layer as well as the number of and an arrangement of the throughholes, and the like are chosen, and values and the like of them are selected as prescribed. Those skilled in the art can conduct this selection for these factors, for example, by trial-and-error.

In one preferable embodiment, the electrically conductive metal thin layer and the fuse layer are integrally formed by plating with the metal having a higher melting point and plating with the metal having a lower melting point, and more preferably Ni plating and Sn plating. In this embodiment, the fuse layer consists of the first metal layer (Ni plate) and the second metal layer (Sn plate). In this case, there is an advantage that the electrically conductive metal thin layer and the fuse layer can be simultaneously and integrally formed by plating the laminar element having the throughhole with the metal having a higher melting point and the metal having a lower melting point. That is, the fuse layer and the electrically conductive metal thin layer are formed from the same kind of metals. As a plating method for forming the fuse layer and the electrically conductive metal thin layer, an electrolytic plating method or an electroless plating method can be used. It is preferable that the electroless plating method is used for the metal having a higher melting point and the electrolytic plating method is used for the metal having a lower melting point.

In a particularly preferable embodiment, the metal foil, preferably the nickel foil or the nickel plated copper foil which adheres closely to the laminar element beforehand is present between the laminar element and the electrically conductive metal thin layer. In this case, the electrically conductive metal thin layer which is formed as the plating layer can adhere closely to the metal foil, so that, there is an advantage that the electrically conductive metal thin layer can be strongly bonded to the laminar element via the metal foil.

In order to protect a circuit to be protected or an electrical element constituting it, the protection device of the present invention is positioned between the first electrical element (for example, a secondary battery) and the second electrical element (for example, a battery charger) as other electrical element so as to directly or indirectly connect them electrically. As a result, one electrically conductive metal thin layer directly or indirectly contacts the first electrical element, and the other electrically conductive metal thin layer directly or indirectly contacts the second electrical element. Therefore, the present invention also provides an electrical apparatus which comprises the protection device of the present invention and a circuit and/or an electrical element which is electrically connected with the protection device.

The protection device of the present invention has the electrically conductive metal thin layers on both main surfaces of the laminar element, and the fuse layer electrically connects them, and thereby enabling a large amount of the current to flow. Simultaneously, when an excessive current flows, it flows through the fuse layer with being concentrated, so that the fuse layer melts to open a circuit, and thereby interrupting the excessive current.

DETAILED DESCRIPTION OF THE INVENTION

Figure 1:
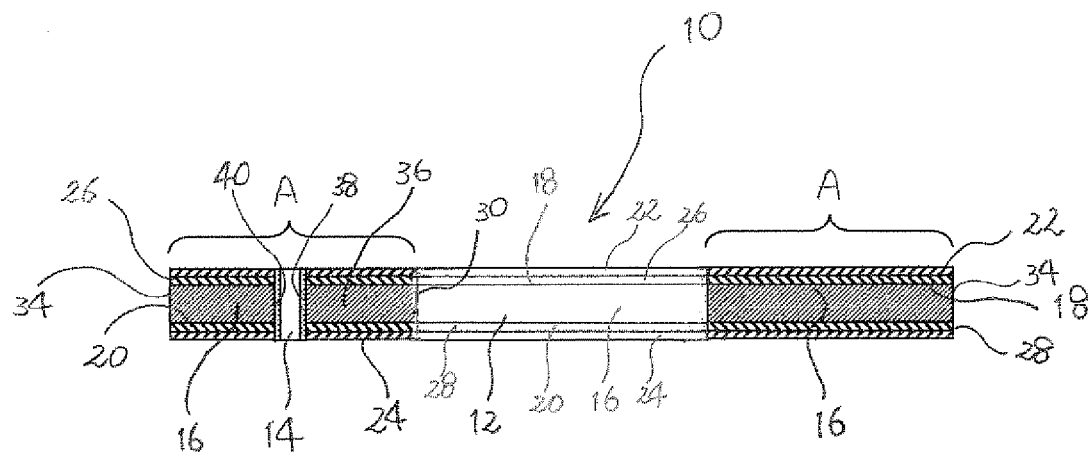
FIG. 1 schematically shows a protection device of the present invention in a cross-sectional view along its thickness-direction.
Figure 2:
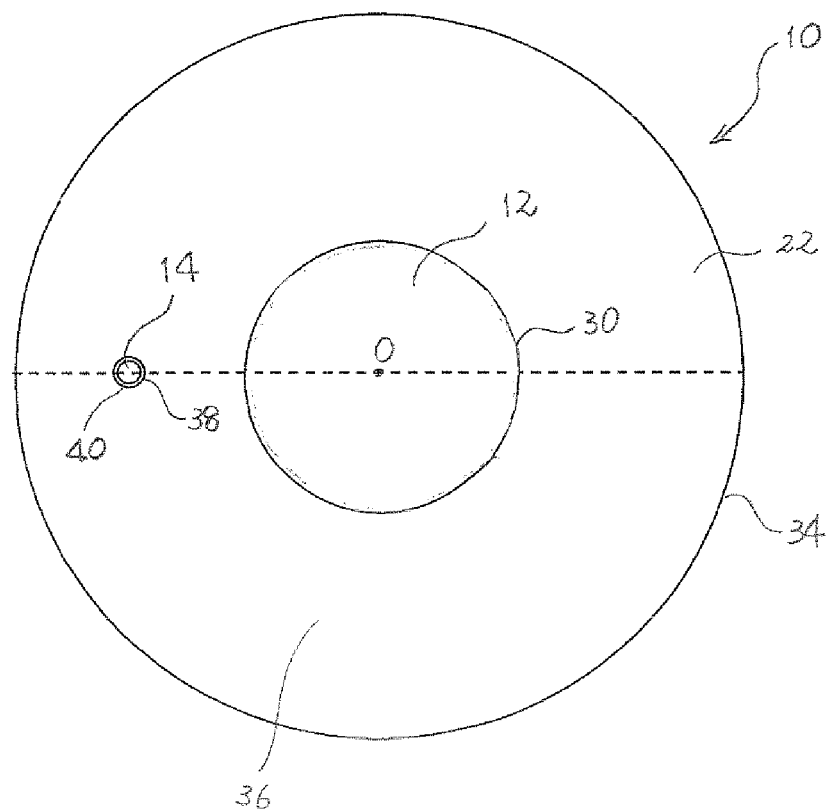
FIG. 2 schematically shows in a plane view the protection device which is shown in FIG. 1.
Figure 3:
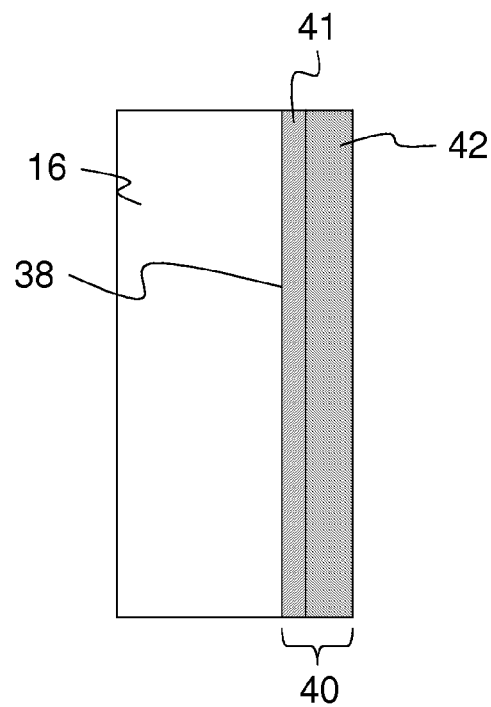
FIG. 3 schematically shows in a cross-sectional view a fuse layer in the protection device which is shown in FIGS. 1 and 2.

The protection device of the present invention will be described in detail with reference to the accompanied drawings. In FIG. 1, one embodiment of the protection device of the present invention is schematically shown in a cross-sectional view along its thickness-direction (a portion which appears as the cut plane is indicated with an arrow "A"). Also, in FIG. 2, the protection device shown in FIG. 1 is schematically shown in a plane view. Furthermore, in FIG. 3, a fuse layer in the protection device shown in FIGS. 1 and 2 is schematically shown in a cross-sectional view.

The illustrated protection device 10 comprises an annular laminar element 16 which is formed of the insulation resin and has at least one throughhole (in the illustrated embodiment, two throughholes of a central throughhole 12 having a circular cross-section and a surrounding throughhole 14 having a circular cross-section). The protection device 10 comprises electrically conductive metal thin layers 22 and 24 which are positioned on both main surfaces 18 and 20 respectively of the laminar element 16. It is noted that in the illustrated embodiment, separate metal layers 26 and 28 are present between the laminar element 16 and the electrically conductive metal thin layers.

In the illustrated embodiment, the fuse layer is absent on an inner periphery 30 of the circular ring which defines the central throughhole, i.e. on a side surface inside of the annular ring. In the illustrated embodiment, a fuse layer 40 is present on a peripheral side surface 38 which defines the surrounding throughhole 14 positioned through a main body 36 of the laminar element between the inner periphery 30 and the outer periphery 34.

In the illustrated embodiment, the fuse layer 40 consists of a first metal layer 41 located on the peripheral side surface 38 which defines the surrounding throughhole 14 and a second metal layer 42 located on the first metal layer 41.

In the illustrated embodiment, the surrounding throughhole 14 having the fuse layer 40 is only one which is provided at the midpoint of the main body 36 along the diameter (shown with a broken line in FIG. 2) passing through a center "O" of the laminar element, but such surrounding throughhole may be provided at the opposite side along the diametrical direction. In this case, it results in providing surrounding throughholes at every 180° (totally providing two throughholes) around the center "O". In a further other embodiment, three, four, six or eight of the surrounding throughholes having the fuse layer may be provided at an equal angle interval of 120°, 90°, 60° or 45° around the center "O" of the circle, respectively.

It is noted that since the diameter of the central throughhole is far larger than the diameter of the surrounding throughhole, the fuse layer is absent on the side surface of the inner periphery 30 of the annular ring. However, the fuse layer may be provided on the side surface of the inner periphery 30 of the annular ring if necessary when the diameter of the central throughhole is the similar to or smaller than the diameter of the surrounding throughhole. It is noted that in a certain embodiment, when a convex part corresponding to the central throughhole is provided to an electrical apparatus to which the protection device is to be disposed, the protection device may be located on the electrical apparatus by fitting the convex part into the large diameter part of the central throughhole. For example, such convex part is provided on a sealing plate of a secondary battery cell, so that the convex part is fitted into the central throughhole, and thereby enabling to position the protection device on the sealing plate.

In other embodiment, the laminar element 16 does not have the central throughhole 12 (therefore, the laminar element is in a disk-shape) and has only at least one surrounding throughhole 14 which may have the fuse layer 40.

Figure 4:
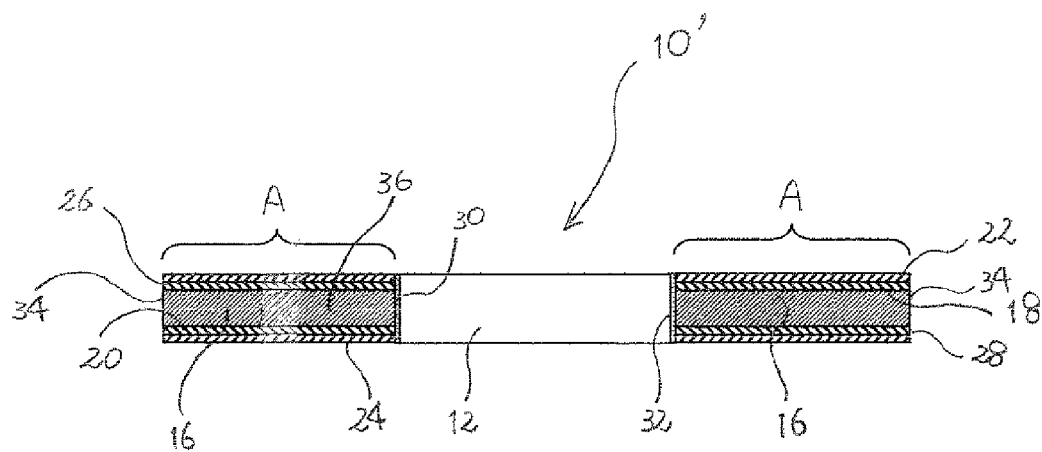
FIG. 4 schematically shows a protection device of the present invention of other embodiment in a cross-sectional view along its thickness-direction.
Figure 5:
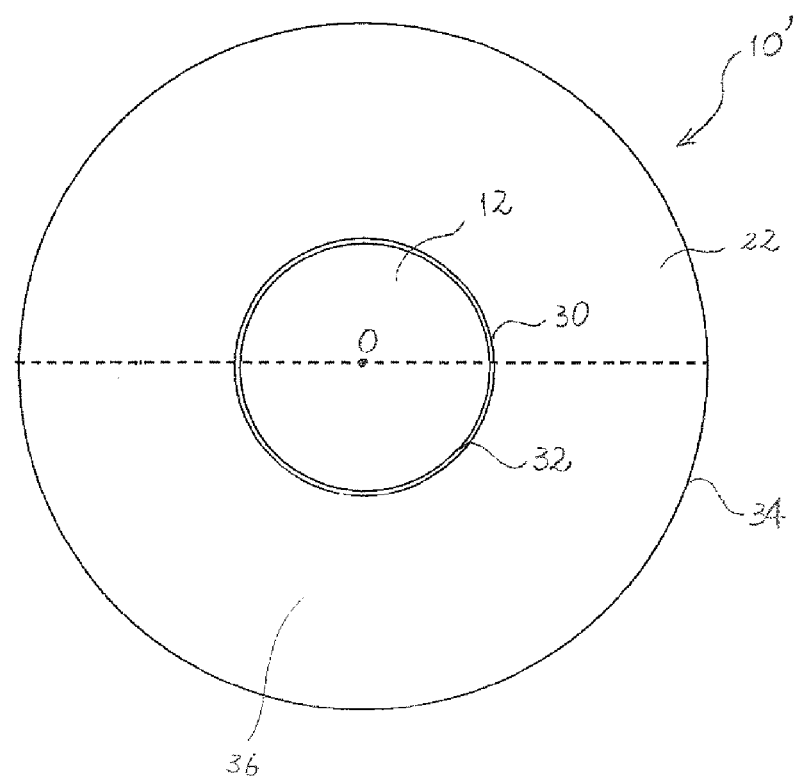
FIG. 5 schematically shows the protection device in a plane view which is shown in FIG. 4.
Figure 6:
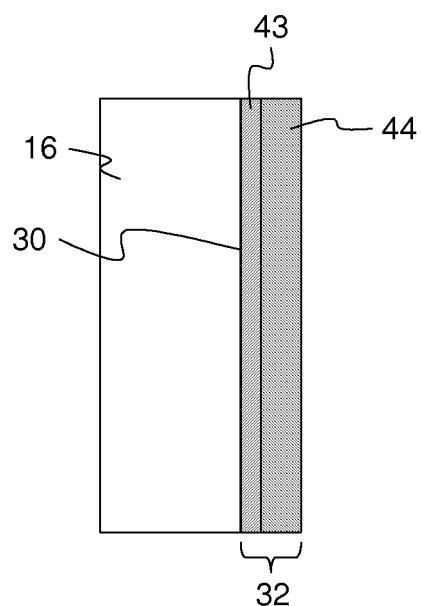
FIG. 6 schematically shows in a cross-sectional view a fuse layer in the protection device which is shown in FIGS. 4 and 5.

A protection device 10' of a further embodiment of the present invention is shown in FIGS. 4 and 5 similarly to FIGS. 1 and 2. A fuse layer 32 is shown in FIG. 6 similarly to FIG. 3. It is noted that the same reference numerals are used for the same elements as in FIGS. 1-3. In the illustrated embodiment, the laminar element 16 does not have the surrounding throughhole 14 and has only the central throughhole 12 which has the fuse layer 32. The fuse layer 32 consists of a first metal layer 43 located on the inner periphery 30 which defines the central throughhole 12 and a second metal layer 44 located on the first metal layer 43.

Example 1

The protection device of the present invention shown in FIGS. 1 and 2 was produced. Therefore, the protection device 10 was produced which has only the fuse layer 40 but does not have the fuse layer 32. It is noted that eight surrounding throughholes 14 were circumferentially formed at an equal angle interval.

First, a sheet of an insulation resin (made of polyethylene, having a thickness of 0.3 mm, corresponding to the laminar element 16) was prepared, nickel foils (having a thickness of 22 μm, corresponding to the separate metal layers 26 and 28) were positioned on the both side of the sheet, and they were pressed while heating to be integral to obtain a pressure-bonded product wherein the nickel foils were applied to the both main surfaces.

Throughholes (corresponding to the surrounding throughhole 14) which were of 0.6 mm in a diameter were formed at prescribed positions of the pressure-bonded product, and then plating the pressure-bonded product with Ni by an electroless plating process. The thickness of the nickel layer which was formed by Ni-plating was about 1.5 μm. Then, the pressure-bonded product was plated with Sn by an electrolytic plating process. The thickness of the tin layer which was formed by Sn-plating was about 6.5 μm. By such plating processes, the electrically conductive metal thin layers (corresponding to the electrically conductive metal thin layers 22 and 24), and the fuse layer (corresponding to the fuse layer 40) consisting of the first metal layer (corresponding to the first metal layer 41) and the second metal layer (corresponding to the second metal layer 42) were obtained. Then, the annular element was stamped out from the pressure-bonded product to obtain the protection device 10 of the present invention wherein eight throughholes were positioned in place at every 45° around the center of the annular element as prescribed.

The diameter of the outer peripheral circle 34 of the obtained circular annular element was 15 mm, and the diameter of the obtained inner peripheral circle 30 (i.e. the diameter of the central throughhole) was 6.4 mm. This circular annular element had nickel foils functioning as the separate metal layers 26 and 28 on the both main surfaces of the insulation resin layer as the laminar element 16, and had the surrounding throughholes 14 at the midpoint of the maim body 36 which was a part of the circular annular element. Also, the circular annular element had plated layers (the nickel plated layer and the tin plated layer) as the electrically conductive metal thin layers 22 and 24 on the nickel foils, and had plated layers functioning as the fuse layers 40 consisting the first metal layers 41 and the second metal layers 42 on the inner peripheral surfaces which define the surrounding throughholes.

Examples 2 and 3

The protection devices of Examples 2 and 3 were obtained similarly to Example 1 except that Sn—Cu plating (Cu 4% by weight) and Sn—Bi plating (Bi 16% by weight) were conducted in place of tin-plating, respectively.

Comparative Examples 1 to 3

The protection devices of Comparative Examples 1-3 were obtained similarly to Example 1 except that nickel-plating were conducted in place of tin-plating, and the thickness of the nickel plated layer formed by the nickel plating was 4.5, 6.5 and 8.5 μm, respectively.

Characteristics of Examples 1-3 and Comparative Example 1-3 are shown below.

TABLE 1

| | Example 1 | Example 2 | Example 3 |
|---|---|---|---|
| Electroless plated material | Ni | Ni | Ni |
| Electrolytic plated material | Sn | Sn—Cu (Cu 4 wt %) | Sn—Bi (Bi 16 wt %) |
| Thickness of electroless plate (μm) | 1.5 | 1.5 | 1.5 |
| Thickness of electrolytic plate (μm) | 6.5 | 6.5 | 6.5 |
| Total plate thickness (μm) | 8.0 | 8.0 | 8.0 |
| Higher melting point plate/ Lower melting point plate ratio (%) | 23.1 | 23.1 | 23.1 |

TABLE 1-continued

| | Comparative Example 1 | Comparative Example 2 | Comparative Example 3 |
|---|---|---|---|
| Electroless plated material | Ni | Ni | Ni |
| Electrolytic plated material | Ni | Ni | Ni |
| Thickness of electroless plate (μm) | 1.5 | 1.5 | 1.5 |
| Thickness of electrolytic plate (μm) | 4.5 | 6.5 | 8.5 |
| Total plate thickness (μm) | 6.0 | 8.0 | 10.0 |
| Higher melting point plate/ Lower melting point plate ratio (%) | 33.3 | 23.1 | 17.6 |

Experiment 1: A current listed in following Table 2 was passed through the protection devices of Examples 1-3 and Comparative Examples 1-3 from one electrically conductive metal thin layer 22 to the other electrically conductive metal thin layer 24, and a current value which does not cause a blow was evaluated even when the current was passed for 10 minutes (at 60 Vdc). The maximum value of current which continues to flow without blowing (melting) of the fuse layer was defined as "rated capacity". The results are shown in Table 2. It is noted that "o" denotes no blow occurred for 10 minutes, "x" denotes the blow occurred within 10 minutes, and "–" denotes no data is available.

TABLE 2

| Current Value | Example 1 | Example 2 | Example 3 | Comparative Example 1 | Comparative Example 2 | Comparative Example 3 |
|---|---|---|---|---|---|---|
| 10 A | o | o | o | o | o | o |
| 15 A | o | o | o | o | o | o |
| 17.5 A | o | o | o | — | — | — |
| 20 A | o | o | o | o | o | o |
| 22.5 A | o | o | o | — | — | — |
| 25 A | x | o | x | o | o | o |
| 30 A | | x | | x | x | x |

Experiment 1: A current which was 150%, 200%, 300% and 400% of a rated capacity was passed through the protection device of Examples 1-3 and Comparative Examples 1-3 from one electrically conductive metal thin layer 22 to the other electrically conductive metal thin layer 24, and a current-interrupted time (i.e. time which elapsed before the fuse layer was blown) was measured. The results are shown in following Table 3.

TABLE 3

| | Elapsed time before blowing (second) | | | | | |
|---|---|---|---|---|---|---|
| Excessive Current (%) | Example 1 | Example 2 | Example 3 | Comparative Example 1 | Comparative Example 2 | Comparative Example 3 |
| 150 | 4.80 | 13.1 | 2.00 | no blow within 30 sec | no blow within 30 sec | no blow within 30 sec |

TABLE 3-continued

| | Elapsed time before blowing (second) | | | | | |
|---|---|---|---|---|---|---|
| Excessive Current (%) | Example 1 | Example 2 | Example 3 | Comparative Example 1 | Comparative Example 2 | Comparative Example 3 |
| 200 | 1.64 | 1.65 | 0.80 | 3.56 | 3.80 | 4.50 |
| 300 | 0.29 | 0.21 | 0.19 | 0.25 | 0.26 | 0.29 |
| 400 | 0.07 | 0.04 | 0.04 | 0.06 | 0.07 | 0.07 |

From these results, it has been confirmed that the protection device of the present invention provides rapid and sure protection with an excessive current about 1.5 times its rated capacity.

The protection device of the present invention can be used as a protection device which interrupts an excessive current when the excessive current flows in an electrical apparatus such as a secondary battery. The protection device of the present invention can also be used as an alternative to a nickel washer, a washer in which a stainless material is nickel-plated or the like which is for example incorporated into a sealing plate in a cylindrical lithium ion secondary battery cell. In this case, since the protection device has the laminar element which is formed of the insulation resin, the function of the protection device as a washer is increased due to elasticity of the resin. Therefore, the present invention can also be used as a washer which has characteristics of the protection device of the present invention as described above.

The element reference numerals are:
10, 10'—protection device;
12—central throughhole
14—surrounding throughhole;
16—laminar element
18, 20—main surface;
22, 24—electrically conductive metal thin layer
26, 28—other metal layer;
30—inner periphery
32—fuse layer;
34—outer periphery
36—main body;
38—side surface;
40—fuse layer
41—first metal layer;
42—second metal layer
43—first metal layer;
44—second metal layer

What is claimed is:

1. A protection device which comprises:
   an annular laminar element formed of an insulation resin and having a first throughhole at a radial center thereof;
   an annular metal foil positioned on each main surface of the laminar element and coaxial with the laminar element;
   an annular electrically conductive metal thin layer positioned on each of the metal foils and coaxial with the laminar element; and
   a first fuse layer disposed on a side surface defining the first throughhole and electrically connecting the electrically conductive metal thin layers, wherein the fuse layer comprises a first metal layer and a second metal layer, the first metal layer formed of a metal having a higher melting point than a metal from which the second metal layer is formed.

2. The protection device according to claim 1, characterized in that the metal having the higher melting point is Ni.

3. The protection device according to claim 1, characterized in that the metal having the lower melting point has a melting point lower than a decomposition temperature of the insulation resin.

4. The protection device according to claim 3, characterized in that the metal having the lower melting point is Sn, an Sn—Cu alloy or an Sn—Bi alloy.

5. The protection device according to claim 1, characterized in that the first metal layer is formed by electroless plating with the metal having the higher melting point and the second metal layer is formed by electrolytic plating with the metal having the lower melting point on the first metal layer.

6. The protection device according to claim 1, characterized in that a thickness ratio between the first metal layer and the second metal layer is 1:100 to 5:1.

7. The protection device according to claim 1, characterized in that the electrically conductive metal thin layer and the fuse layers are formed to be integral by plating with the metal having the higher melting point and the metal having the lower melting point.

8. The protection device according to claim 1, characterized in that the metal foil is a nickel foil.

9. The protection device according to claim 1, characterized in that the laminar element includes an inner periphery surface and an outer periphery surface, the inner periphery surface defining the first throughhole, the protection device further comprising a second throughhole positioned between the inner periphery surface and the outer periphery surface, the second throughhole having a second fuse layer disposed on a side surface thereof.

10. A secondary battery cell comprising a protection device which comprises:
    an annular laminar element formed of an insulation resin and having a first throughhole at a radial center thereof;
    an annular metal foil positioned on each main surface of the laminar element and coaxial with the laminar element;
    an annular electrically conductive metal thin layer positioned on each of the metal foils and coaxial with the laminar element; and
    a first fuse layer disposed on a side surface defining the first throughhole and electrically connecting the electrically conductive metal thin layers, wherein the fuse layer comprises a first metal layer and a second metal layer, the first metal layer formed of a metal having a higher melting point than a metal from which the second metal layer is formed.

11. The secondary battery cell according to claim 10, characterized in that the metal having the higher melting point is Ni.

12. The secondary battery cell according to claim 10, characterized in that the metal having the lower melting point has a melting point lower than a decomposition temperature of the insulation resin and is Sn, an Sn—Cu alloy or an Sn—Bi alloy.

13. A washer which comprises:
    an annular laminar element formed of an insulation resin and having a first throughhole at a radial center thereof;
    an annular metal foil positioned on each main surface of the laminar element and coaxial with the laminar element;
    an annular electrically conductive metal thin layer positioned on each of the metal foils and coaxial with the laminar element; and a first fuse layer disposed on a side surface defining the first throughhole and electrically connecting the electrically conductive metal thin layers, wherein the fuse layer comprises a first metal layer and a second metal layer, the first metal layer formed of a metal having a higher melting point than a metal from which the second metal layer is formed.

* * * * *